June 7, 1927.
J. J. BAMBACH ET AL
1,631,454
LIQUID DISPENSING APPARATUS
Filed July 6, 1926
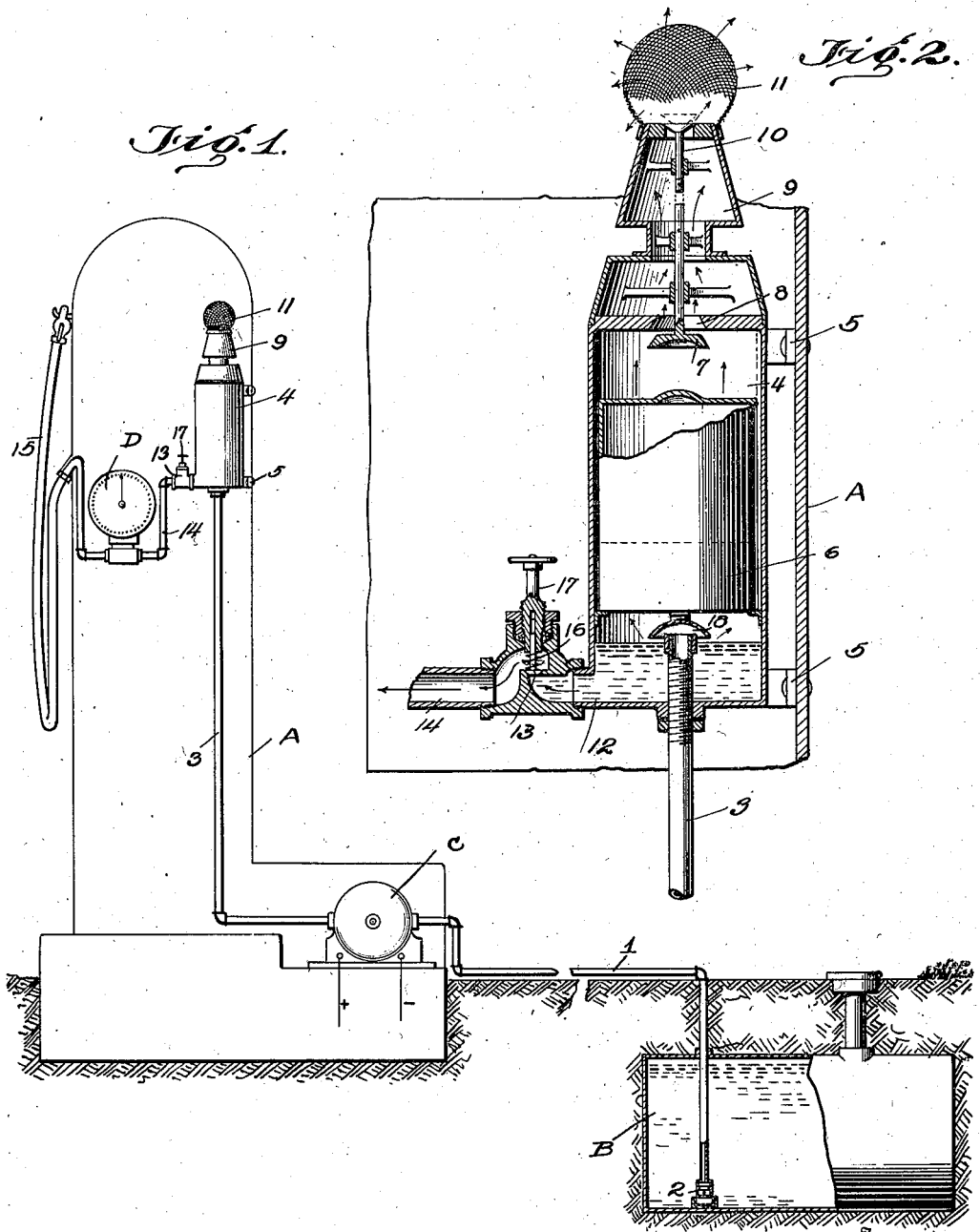

Patented June 7, 1927.

1,631,454

UNITED STATES PATENT OFFICE.

JOHN J. BAMBACH AND MARTIN W. COLLINS, OF WILKES-BARRE, PENNSYLVANIA.

LIQUID-DISPENSING APPARATUS.

Application filed July 6, 1926. Serial No. 120,634.

Our invention relates to liquid dispensing apparatus, and more particularly to that class of apparatus, in general use, for dispensing measured quantities of gasoline from a storage tank which is usually located below the surface of the ground on which the dispensing apparatus is erected.

In apparatus of this character a motor-operated pump is connected in a suitable pipe line between the storage tank and the dispensing apparatus, and serves to draw up liquid through a foot valve at the lower end of the pipe line and deliver the liquid through a meter to a dispensing hose. Due to varying conditions in the operation of such apparatus, inaccurate registering of the liquid dispensed through the meter often occurs.

It has been found that, during the intervals when the pumping apparatus is at rest, air enters the upper end of the pipe line to dispace the liquid which, due to imperfect closure of the foot valve, leaks back into the storage tank. The pipe line is thus gradually drained and filled with air after each operation of the pump. On repeated operations of the pump the air previously drawn into the pipe line is forced through the meter by the rise of liquid in the line. As flow meters employed in apparatus of this character respond to air, as well as to liquid, the quantity of liquid indicated by the meter may be deficient due to the amount of air passing through the meter with the liquid to the dispensing hose. It is also known that meters of this character will not register accurately on all or varying pressures of the liquid forced therethrough.

It is therefore an object of our invention to automatically bleed the pipe line of all gas or air upon starting of the pumping apparatus, and to prevent liquid in the pipe line from entering the meter until a predetermined pressure is built up in the system.

A further object of our invention is to provide means for normally closing the exits for air and liquid at the upper end of the dispensing apparatus and thereby preventing entrance of air to the pipe line or the back flow of liquid and gas through the meter upon imperfect closure of the foot valve at the lower end of the system.

Referring to the accompanying drawings, which are made a part hereof, and on which similar reference characters indicate similar parts;

Fig. 1 is a side elevation of our improved dispensing apparatus, partly in section, showing the relation of the several co-operating parts, and, Fig. 2 is a vertical section taken through a part of Fig. 1, to show the interior of the float chamber and the operative relation of the several valves which are associated therewith.

In the drawings, the parts indicated as A represent a casing or support for the dispensing apparatus hereinafter to be described, B the low level liquid storage tank, C the motor operated pump, and D the flow meter. All of these parts may be of any well known or approved construction and design, providing they do not depart from the spirit of our invention.

The motor operated pump C serves in operation to draw up liquid from the storage tank B through a section of pipe line 1 which extends into the tank B and is provided with a foot or check valve 2 at its lower end. From the discharge side of the pump C another section of pipe line 3 leads into the casing A and is connected at its upper end with a chamber 4. The chamber 4 is supported within the casing A by any suitable means, such as by brackets 5, which serve to hold the chamber in upright position and thereby insure proper operation of the gravity-operated parts now to be described.

Within the chamber 4 is a float 6 which rises when liquid enters the chamber 4 from the pipe line 3, and closes the air vent valve 7 which co-operates with a port 8 in the upper wall of the chamber 4. An air vent chamber 9 communicates with the port 8 and carries at its upper discharge end a normally closed valve 10 which operates, preferably by gravity, to prevent entrance of air to chambers 9 and 4 and pipe line 3 upon the failure of the foot valve 2 to close the lower end of the pipe line 1. Surrounding the discharge end of the chamber 9 is a fine screen 11 through which air and gas, that may accumulate in the upper end of the system, is discharged.

The float chamber 4 is provided near its lower end with a liquid discharge port 12 which is normally closed by a predetermined pressure operated valve 13. A U-pipe 14, in which a flow meter D is connected, communicates at one end with the valve 13 and at its other end with the usual dispensing hose 15. It will be seen by reference to Fig. 2 that communication between the pipe line 3 and dispensing hose 15 is normally closed by the valve 13 which, through the action of the spring 16 and manually adjustable stem 17, is held in normally closed position under the predetermined set pressure of the spring 16.

When it is desired to dispense a definite quantity of liquid through the hose 15 from the tank B, the motor, operated pump C is started which causes liquid to flow from the tank B, through the pipe lines 1 and 3 and under the baffle 18 into the chamber 4. As the liquid discharge port 12 is closed by the predetermined pressure operated valve 13, all air and gas which is forced into the chamber 4 by the rise of liquid in the pipe lines, seeks an exit through the normally open valve 7, port 8, vent chamber 9, gravity closed valve 10 and fire screen 11, at the upper end of the system. As liquid enters the chamber 4, from the pipe line 3, it is directed downwardly by the baffle 18 and gradually filling the chamber, lifts the float 6 until it engages and closes the vent valve 7. On continued operation of the pump C liquid pressure is built up in the chamber 4 and pipe line 3, until the liquid pressure exceeds that of the predetermined set pressure of the spring 16 which holds the valve 13 in normally closed position. Liquid is now dispensed through the port 12, valve 13, U-pipe 14, meter D and hose 15, until the motor operated pump is stopped. By operation of the manually adjustable stem 17 on the spring 16 and valve 13, the pressure of the liquid delivered to the meter D is regulated. The apparatus is thereby adjustable to deliver liquid through the meter at the pressure on which the meter registers most efficiently.

When the desired quantity of liquid has been dispensed through the meter D and hose 15, the motor-operated pump C is stopped. The pressure in the chamber 4 and pipe line 3 now drops below that of the adjusted tension of the spring 16, causing the valve 13 to close the liquid port 12, and preventing back flow of liquid and air into the chamber 4 and pipe lines 3 and 1, in the event the foot valve 2 fails to seat perfectly. The normally closed valve 10 at the upper vent discharge end of the system being also closed, by gravity, serves to prevent air from entering the chambers 9 and 4 to displace liquid which would otherwise seek its way back into the storage tank B through the imperfectly closed foot valve 2. It will thus be seen that, after an initial operation of the pump C, the system remains filled with liquid and in readiness to dispense accurately measured quantities of liquid through the dispensing hose 15.

What we claim is:

1. In combination with a liquid dispensing apparatus including a liquid storage tank, a pipe line connected with said storage tank at one end and a dispensing hose at the other end, a flow meter in said pipe line adjacent said hose, a foot valve for said pipe line located within said tank, and a pump connected in said pipe line, of valve means connected in the high point of said pipe line, said valve means automatically opening to vent said pipe line when the pump is in operation and closing to prevent admission of air when the pump is idle, whereby said pipe line is maintained filled with liquid to the high point in the line.

2. In an apparatus for automatically bleeding air and gas from the delivery pipe line of a liquid dispensing apparatus during operation thereof and preventing entrance of air to said pipe line to displace liquid therein when the apparatus is at rest, comprising a chamber connected in said delivery pipe line and having a vent port, valve means mounted in said chamber and operable by the elevation of liquid in said chamber to open and close communication to said vent port, and a second valve normally closing said vent port.

3. In an apparatus of the character described the combination of a liquid pipe line, a meter connected in said pipe line, means for forcing liquid through said pipe line and said meter, and means for closing communication to said meter until a fixed pressure exists at said means.

4. In an apparatus for delivering measured quantities of liquid from a supply tank through a flow meter, comprising a pipe line connecting said tank and meter, a pump connected in said line, automatic means connected in said pipe line adjacent said meter for bleeding said pipe line of air and gas, and a predetermined pressure set valve normally closing communication between said means and said meter.

In testimony whereof we affix our signatures.

JOHN J. BAMBACH.
MARTIN W. COLLINS.